(12) United States Patent
Maekawa et al.

(10) Patent No.: US 6,896,790 B1
(45) Date of Patent: May 24, 2005

(54) APPARATUS FOR OXIDATIVELY DESTRUCTING TRACE INJURIOUS SUBSTANCE

(75) Inventors: Takaaki Maekawa, Ibaraki (JP); Chuanping Feng, Ibaraki (JP)

(73) Assignee: Japan Science & Technology Corporation, Saitama (JP)

( * ) Notice: Subject to any disclaimer, the term of this patent is extended or adjusted under 35 U.S.C. 154(b) by 0 days.

(21) Appl. No.: 09/959,726
(22) PCT Filed: May 2, 2000
(86) PCT No.: PCT/JP00/02907

§ 371 (c)(1),
(2), (4) Date: Apr. 4, 2002

(87) PCT Pub. No.: WO00/68153

PCT Pub. Date: Nov. 16, 2000

(30) Foreign Application Priority Data

May 6, 1999 (JP) .......................... 11-126392

(51) Int. Cl.⁷ ................................. C02F 1/46
(52) U.S. Cl. ............... 205/688; 205/701; 205/742; 205/746; 204/164; 204/275.1; 204/252; 422/186.04
(58) Field of Search ................. 205/688, 701, 205/742, 746; 204/164, 275.1, 252; 422/186.04

(56) References Cited

U.S. PATENT DOCUMENTS 4,131,526 A 12/1978 Moeglich
5,746,051 A * 5/1998 Kieser et al. .................. 60/275
6,712,947 B1 * 3/2004 Maekawa et al. ........... 204/555

FOREIGN PATENT DOCUMENTS

| EP | 379760 | 8/1990 |
| JP | 4-338215 | 11/1992 |
| JP | 7-265652 | 10/1995 |
| JP | 11-169645 | 6/1999 |
| WO | 97/03746 | 2/1997 |

* cited by examiner

Primary Examiner—Arun S. Phasge
(74) Attorney, Agent, or Firm—Wenderoth, Lind & Ponack, L.L.P.

(57) ABSTRACT

An apparatus for oxidatively destructing a trace injurious substance includes a structure with anodes, each integrally provided with an electrically conductive oxide on their surface and made of a metal. A partition made of a porous ceramic or resin is provided between the anodes and surrounded by cathodes made of a metal plate having inner walls on both sides to which a noble metal is fused, such that at least two chambers with spaces are formed in a plane symmetrical arrangement to provide an apparatus for oxidatively destructing a trace injurious substance contained in polluted water. The apparatus has a rectangular wave discharging device for applying an electric field to the spaces, such that polluted water flows through the inner space of one of the chambers and is subjected to the irradiation of an electric field, and the supernatant thereafter flows through the inner space of the other chamber and is subjected to the irradiation of an electric field.

27 Claims, 8 Drawing Sheets

APPARATUS FOR OXIDATIVELY DESTRUCTING TRACE INJURIOUS SUBSTANCE

TECHNICAL FIELD

The invention of the present application relates to an apparatus for oxidatively destructing trace injurious substances. In further detail, the invention of the present application relates to an apparatus for oxidatively destructing trace injurious substances contained in polluted water or gas exhaust, which is useful for separating and destructing the algae fertilized by the eutrophication of ponds, lakes, or lagoons, or predatory small animals or fungi that live on them, as for the decomposition treatment of injurious chemical compounds and the like known as environmental hormones such as trihalomethanes, tributyltin, etc. The present invention relates to a method of oxidative destruction using the above apparatus.

BACKGROUND OF THE INVENTION

Various types of methods or means for separating and destructing injurious substances contained in polluted water or gas exhaust have been studied up to the present, and there also are various types of methods put into practice.

In the methods above, chemical methods comprising adding chemicals into or bringing them in contact with the polluted water or gas exhaust to decompose the injurious substances, biological methods characterized by treating the injurious substances with microorganisms, and electrochemical decomposition methods are mainly known.

However, from the viewpoint of efficiently treating a large quantity of polluted water from ponds, lakes, lagoons, rivers, etc., or from the viewpoint of completely separating and destructing the fertilized algae and predatory small animals or fungi and the like that live on them, or from the viewpoint of decomposing organic compounds recently attracting much attention as serious problems of environmental hormone substances such as trihalomethanes, tributyltin, etc., the methods above all have both advantages and disadvantages. Thus, there has been found a problem that none of the methods above is applicable as a generalized means or method.

More specifically, although an oxygen radical treatment technique for decomposing polyphenols and trihalomethanes using titanium oxide and UV radiations has been developed, there is a problem that the cost of running the method is too expensive due to a low photon efficiency of the UV radiation. Concerning the method for removing blue algae from wastewater, a pressure flotation method has been developed. However, this method not only suffers high operating cost due to the use of flocculants, but also has technological limits such that a high removal ratio exceeding 95% cannot be achieved. Furthermore, this method does not provide a comprehensive solution for the removal of soluble COD.

In light of the aforementioned circumstances, the inventors of the present application have found that the use of a high electric field pulse discharge for the oxidative decomposition treatment is effective, and studies have been made on a desirable method of applying the oxidative decomposition and on the apparatus therefor.

SUMMARY OF THE INVENTION

The invention of the present application has been accomplished on the aforementioned background. Accordingly, an object of the present invention is to solve the problems of the prior art, and to provide apparatuses for oxidative destruction of trace injurious substance contained in polluted water or gas exhaust for general use, and which are capable of efficient mass treatment and yet widely applicable to various types of objects to be treated. Another object of the invention of the present application is to provide methods using the above apparatuses.

Furthermore, more specifically, an object of the present invention is to provide a novel oxidative destruction apparatus capable of solving the problems of prior art technology (i.e., that a pressure flotation method applied to the removal of algae floating in polluted water is an energy input type method unable to completely remove soluble COD, and that the decomposition efficiency in the removal of aromatic substances such as a phenol remains as low as in a range of 40 to 50% in case of using oxygen radical oxidation using ozone or UV, due to the inability of achieving a ring opening reaction within a short period of time). Another object of the invention of the present application is to provide a method using the apparatus above.

As a solution to the aforementioned problems, the invention according to the present application provides, firstly, an apparatus for oxidatively destructing a trace injurious substance. The apparatus has a structure comprising anodes each integrally provided with an electrically conductive oxide on its surface and made of a metal. A partition made of a porous ceramic or resin is provided between the anodes and surrounded by cathodes made of a metal plate having inner walls on both sides to which a noble metal is fused, such that at least two chambers with spaces are formed in a plane symmetrical arrangement to provide an apparatus for oxidatively destructing trace injurious substances contained in polluted water. The apparatus is equipped with a rectangular wave discharging device for applying an electric field to the chambers, such that polluted water flows through the inner space of one of the chambers and is subjected to the irradiation of an electric field. The supernatant thereafter flows through the inner space of the other chamber and is subjected to the irradiation of an electric field.

Then, secondly, there is provided an oxidatively destructing apparatus in accordance with the apparatus above. The partition is set at a distance in a range of from 1 to 10 cm from the anode and the cathode, and the rectangular wave discharge is applied to the spaces at a frequency of from 10 to 200 kHz, a linear voltage of from 200 V/cm to 10 kV/cm, and a current of from 0.5 to 50 mA, and the polluted water flows to the first space at a flow rate in a range of from 0.01 to 0.1 m/s. Thirdly, there is provided an oxidatively destructing apparatus in accordance with the apparatus above, wherein the electrically conductive oxide integrally provided to the surface is made of at least one selected from the group consisting of titanium oxide, tin oxide, and ruthenium oxide, and the noble metal fused to the metal plate is platinum.

Furthermore, fourthly, the invention of the present application provides an apparatus differing from those described in the first to the third embodiments described above, (i.e., an apparatus for oxidatively destructing a trace injurious substances. The apparatus has a structure comprising a box-like vessel made of a metal or having a metallic surface which forms a space by surrounding porous metal plates each integrally provided with a thin film of electrically conductive oxide particles on both of its surfaces, and is thereby imparted with selective molecular fractionation transmittance to provide a cathode, and porous metal plates as anodes to provide an apparatus for oxidatively destructing trace injurious substance contained in polluted water. The apparatus is equipped with a voltage applying device for applying an electric field to the anode and the cathode, and polluted water is pressure circulated through the inner space of one of the chambers surrounded by the porous metal plate and the box-like vessel while applying voltage to the anode and the cathode, thereby performing ultrafiltration to output the filtrate into the space on the other side.

Fifthly, there is provided an oxidatively destructing apparatus in accordance with the apparatus above, wherein the porous metal plates are provided with a thin film 10 to 20 $\mu$m in thickness made of electrically conductive oxide particles 0.001 to 0.01 $\mu$m in particle diameter and having a selective transmittance of $50 \times 10^4$ to $2 \times 10^4$ Dalton in molecular fractionation. The polluted water is pressure circulated under a pressure of 0.2 to 6.0 MPa, and the voltage is applied between the anode and the cathode at a frequency of from 10 to 200 kHz and at a linear voltage of from 200 V/cm to 10 kV/cm. In accordance with the sixth aspect of the invention of the present application, there is provided an apparatus as described above, wherein the electrically conductive oxide thin film is made of at least one selected from the group consisting of titanium oxide, tin oxide, and ruthenium oxide, and the box-like vessel is made of stainless metal or such having a platinum surface.

In accordance with the seventh aspect of the invention of the present application, there is provided an apparatus for oxidatively destructing a trace injurious substance having a structure comprising an electrically insulated cylindrical vessel provided at the central portion thereof with a metallic rod coated with an electrically conductive oxide to provide an anode, the outer side thereof being surrounded concentrically by a porous metal plate to provide a cathode. The apparatus further comprises a metallic cylinder the inner surface of which is coated with an electrically conductive oxide provided with a gas inlet portion to introduce a gas into the inner side of said cylinder and with a gas outlet portion, thereby providing an apparatus for oxidatively destructing trace injurious substance contained in gas exhaust, characterized by comprising a power generator for applying a current from 1 to 50 mA at a linear voltage of from 0.4 kV/cm to 7 kV/cm and at a frequency of from 50 to 150 kHz between the anode and the cathode. In the eighth aspect, there is provided an oxidatively destructing apparatus as described above, wherein a partition is provided inside the cylindrical vessel in a direction orthogonal to the central axis.

According to a ninth aspect of the invention, there is provided an apparatus for oxidatively destructing a trace injurious substance having a structure comprising an electrically insulated cylindrical vessel provided at the central portion thereof with a metallic rod-like body which may optionally have platinum provided on the surface thereof to provide a cathode, ceramics or a resin provided to electrically insulate the cathode, a spiral hoop having its surface coated with an electrically conductive oxide and being wound around the cathode, and a stainless steel plate or a titanium plate covering the outer wall of the resulting structure to provide an anode. The cylindrical vessel further comprises a gas inlet portion and a gas exhaust portion to provide an apparatus for oxidatively destructing a trace injurious substance of a gas exhaust. The apparatus further comprises a power generator for applying a current from 1 to 50 mA at a linear voltage of from 0.4 kV/cm to 7 kV/cm and at a frequency of from 50 to 150 kHz between the anode and the cathode. In the tenth aspect, there is provided an apparatus for oxidatively destructing a trace injurious substance having a structure comprising electrically insulated cylinders or rectangular pipes provided with a plurality of metallic cylinders, the insides of which are coated with an electrically conductive oxide or platinum to provide an anode. Metal is placed at the inner center of each of the metallic cylinders to provide cathodes. The structure further comprises a gas inlet portion and a gas exhaust portion to provide an apparatus for oxidatively destructing a trace injurious substance of a gas exhaust, and comprises a power generator for applying a current from 0.5 to 50 mA at a linear voltage of from 0.4 kV/cm to 7 kV/cm and at a frequency of from 50 to 150 kHz between the anode and the cathode.

In the eleventh aspect of the invention, there is provided an oxidatively destructing apparatus as claimed in one of the seventh to tenth aspects, wherein the electrically conductive oxide is at least one selected from a group consisting of titanium oxide, tin oxide, and ruthenium oxide.

In the twelfth aspect of the present invention, there is provided a method for oxidatively destructing a trace injurious substance, in which one of the apparatuses described in the first to the third aspects is used. In the thirteenth aspect, there is provided a method of oxidatively destructing a trace injurious substance, in which one of the apparatuses described in the fourth to the sixth aspect is used; and in the fourteenth aspect, there is provided a method for oxidatively destructing trace injurious substance, in which one of the apparatuses described in the seventh to the eleventh aspect is used.

As described above, the invention according to the present application comprises exposing algae to the irradiation of a pulsed electric field, thereby enabling the destruction of cells by electric perforation while oxidatively decomposing contents or COD components as well as ammonia or nitrate nitrogen that are dissolved in water within a short period of time.

Figure 1:
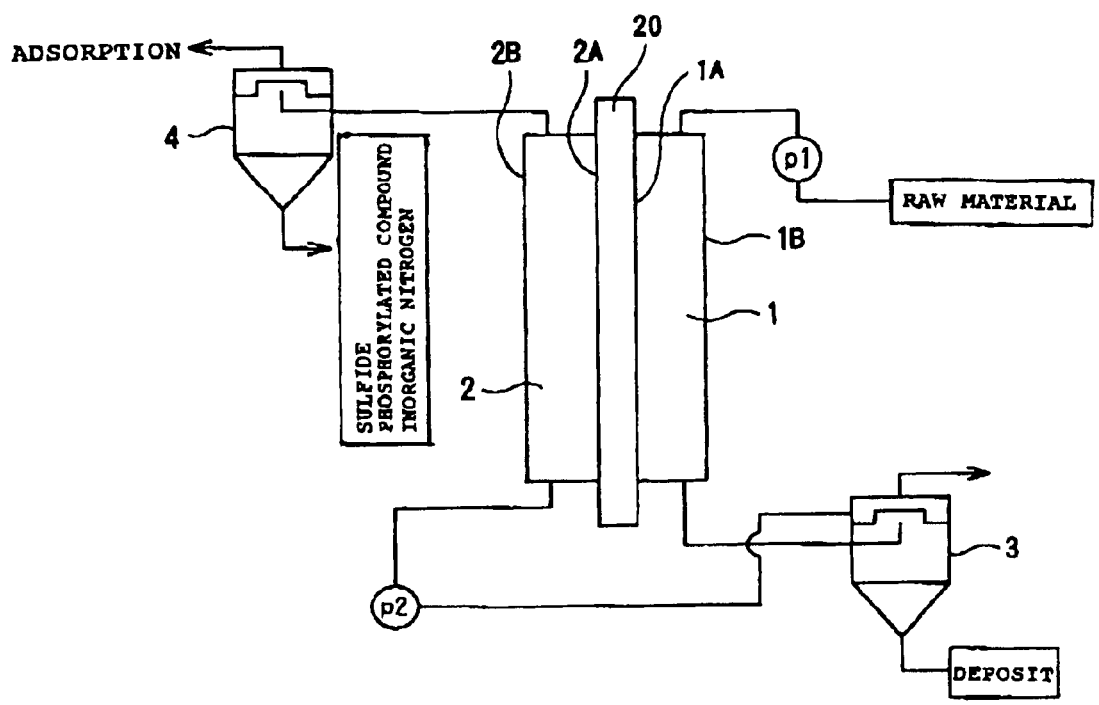
FIG. 1 is a schematic drawing showing an example of an apparatus for use in oxidative decomposition treatment of polluted water according to the present invention.

In the drawings, the reference numbers represent the following: First chamber

| 1A | Anode |
|----|-------|
| 1B | Cathode |
| 2  | Second chamber |
| 2A | Anode |
| 2B | Cathode |

-continued

| | |
|---|---|
| 3,4 | Settling tank |
| 5 | Porous metal plate |
| 6,7 | Box-like vessel |
| 8 | Upper space |
| 9 | Lower space |
| 10 | Anode |
| 11 | Cathode |
| 12 | Cylinder |
| 13 | Flow inlet |
| 14 | Partition plate |
| 15 | Flow outlet |
| 16 | Axial portion |
| 17 | Spiral surface |
| 17A | Insulating plate |
| 18 | Piping |
| 19 | Platinum wire |
| 20 | Partition |

DETAILED DESCRIPTION OF THE INVENTION

The invention according to the present application is characterized by having the aspects described above, and their embodiments are described below.

The principle of the apparatuses in accordance with the first to the seventh aspects of the present application is as follows. When an electron is incorporated into a cavity constituted by the electrically conductive oxide particles of, for example, titanium oxide, ruthenium oxide, or tin oxide, etc., oxygen radicals or hydroxyl radicals generate on the surface for a duration of 10 to 100 $\mu$s. These oxygen radicals or hydroxyl radicals oxidize the soluble components, and the hydroxyl radicals are known to have a great effect on the ring opening of the aromatic phenolic substances. The apparatus of the present invention is an apparatus for treating wastewater by taking advantage of the characteristics of the pulsed irradiation of a high energy electric field.

On irradiating electron beams, the electrons penetrate through the organic cell membranes, and the cell particles become perforated. Since the substance constituting the cell is discharged to the liquid, this method is effective for sterilization. For instance, blue algae are destructed by irradiating electron beams at a linear voltage of 1 kV/cm and at a current of 1 mA. Since .O radicals and .OH radicals leave $H^+$ ions in the liquid after oxidation, the electrically perforated cells are degassed in case they contain oxygen in the cavity. At the same time, the cell membranes are rapidly charged and cause flocculation to easily form deposits. Thus, this method is useful for destructing and removing biological cells.

The apparatuses for oxidatively destructing injurious substances in polluted water according to the first to the third aspects according to the present invention are best suited for the separation and the removal of algae. The basic construction of the apparatuses comprises anodes each integrally provided with an electrically conductive oxide on their surface and made of a metal, and a partition made of a porous ceramic or resin provided between the anodes and surrounded by cathodes made of a metal plate having inner walls on both sides to which a noble metal is fused, such that at least two chambers with spaces are formed in a plane symmetrical arrangement. The apparatus is equipped with a rectangular wave discharging device for applying an electric field to the spaces, such that polluted water flows through the inner space of one of the chambers and is subjected to the irradiation of an electric field. The supernatant thereafter flows through the inner space of the other chamber and is subjected to the irradiation of an electric field.

As preferred embodiments for the constitution described above, the anodes can be spatially provided at a distance of 1 to 10 cm with respect to the partition and the cathodes, and a rectangular wave discharge is applied to the spaces at a frequency of from 10 to 200 kHz, a linear voltage of from 200 V/cm to 10 kV/cm, and a current of from 0.5 to 50 mA, while the polluted water flows to the first space at a flow rate in a range of from 0.01 to 0.1 m/s. The electrically conductive oxide integrally provided to the surface is made of at least one material selected from the group consisting of titanium oxide, tin oxide, and rubidium oxide, and the noble metal fused to the metal plate is platinum.

In the attached drawings, FIG. 1 shows an example of the constitution described above.

In the example, an anode (1A) and a cathode (1B) are provided on a first chamber (1), while an anode (2A) and a cathode (2B) are provided on a second chamber (2), and a partition (20) is provided between the anodes (1A) and (2A).

The liquid containing algae transferred using a pump P1 flows through the first chamber (1), such that it can be subjected to the irradiation of an electric field, and the algae are easily settled and separated from the liquid in a settling tank (3). Then, the supernatant from the settling tank (3) (i.e., the supernatant containing the destructed product of cells and soluble substances) is fed into the second chamber (2) by using a pump P2, such that it is subjected to the irradiation of an electric field. Fine particles deposit in a settling tank (4). A large part of the product is discharged in the form of gaseous $CO_2$ and $N_2$ from the upper part of the settling tanks (3) and (4). However, since toxic gases such as gaseous hydrogen sulfide, $NO_x$, $SO_x$, etc. are generated, preferably, for instance, a treatment of gaseous substances or an adsorption using active carbon as described in the seventh and the eighth aspects of the present invention, is applied.

By utilizing the activity of .O radicals that generate in the cavity of the metal oxides to separate the algae, the flocculation of the fractions of dead cells is accelerated by taking advantage of the chargeability of the $H^+$ ions that generate on the oxidative decomposition of the oxygen radicals. Furthermore, by employing the structure consisting of one electrode and two chambers, the oxidation of the content of the cells is sufficiently achieved to overcome the problems.

Further, since aromatic substances such as dioxin, PCB, etc., that are contained in polluted water generate intermediate products during their ring-opening reaction and oxidative decomposition, an electric field must be applied repeatedly. The constitution of the apparatuses according to the fourth to the sixth aspects of the present invention are provided to easily decompose these substances that are difficult to decompose.

More specifically, the constitution basically comprises a box-like vessel made of a metal or having a metallic surface, which forms a space by surrounding porous metal plates each integrally provided with a thin film of electrically conductive oxide particles on both of its surfaces and thereby imparted with selective molecular fractionation transmittance to provide a cathode, and porous metal plates as anodes to provide an apparatus for oxidatively destructing a trace injurious substance contained in polluted water. The apparatus is equipped with a voltage applying device for applying an electric field to the anode and the cathode, such that polluted water is pressure circulated through the inner space of one of the chambers surrounded by the porous metal plate and the box-like vessel while applying voltage to the anode and the cathode, thereby performing ultrafiltration to output the filtrate into the space on the other side.

As preferred embodiments for the constitution described above, the porous metal plates are provided with a thin film 10 to 20 μm in thickness made of electrically conductive oxide particles 0.001 to 0.01 μm in particle diameter and having a selective transmittance of $50 \times 10^4$ to $2 \times 10^4$ Dalton in molecular fractionation. The polluted water is pressure circulated under a pressure of 0.2 to 6.0 MPa, and the voltage is applied at a frequency of from 10 to 200 kHz and at a linear voltage of from 200 V/cm to 10 kV/cm between the anode and the cathode. The electrically conductive oxide thin film is made of at least one material selected from a group consisting of titanium oxide, tin oxide, and ruthenium oxide, and the box-like vessel is made of a stainless metal or such having a platinum surface.

Figure 2:
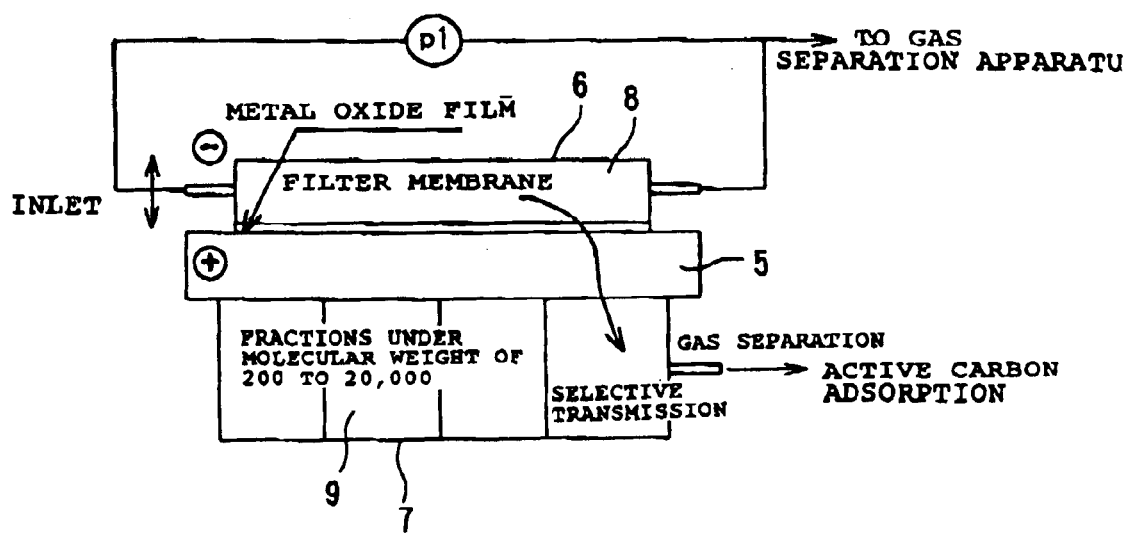
FIG. 2 is a schematic drawing showing another example of an apparatus for use in oxidative decomposition treatment of polluted water.

FIG. 2 shows an example of the constitution described above. Referring to FIG. 2, the raw water to be treated is compressed to a pressure in a range of from 0.2 to 5.0 MPa by using, for instance, a pressurizing pump P1, and is circulated through the upper space (8) that is formed by a porous metal plate (5) used as the anode and a box-like vessel (6) provided as the cathode. In the metal oxide film provided on the surface of the porous metal plate (5) on the upper space (8) side, for instance, small pores 0.002 to 0.01 μm in diameter are provided as interstices, such that the structure functions as a so-called ultrafiltration membrane or a reverse osmosis membrane to intercept the transmission of molecules having a molecular weight of 200 Da (Dalton) or greater. Thus, the substance having a molecular weight of 200 Da or smaller passes through the metallic oxide film and is filtrated to the lower space (9) through the porous metal plate (5). The filtrate water is circulated two to three times by using a pump to completely obtain $CO_2$ and $N_2$.

The frequency, linear voltage, and current of the electric field are varied depending on the molecular weight or the strength of intermolecular bonding force of the hardly decomposable substance. Since decomposed gases are discharged from the circulated water in the upper space (8) and the lower space (9), toxic gases must be treated by the apparatus according to the present invention or absorbed by using active carbon. Presumed from their chemical structures, dioxins and PCBs can be easily decomposed. It is confirmed that, injurious substances contained in underground water, such as trihalomethanes and N-hexane-isopropanol, are 100% decomposed.

Oxygen radicals generate in large quantities in the cavities that are present in the surface of the oxidation electrode. However, the oxidizing force thereof is not so strong, and by carefully choosing the oxidative metals and the morphology of the particles thereof, it is possible to generate .OH radicals in the place of .O radicals depending on conditions. Since such conditions can be confirmed by the coloring of the chemical substances, ring-opening of the aromatic groups can be accomplished in a short period of time by selecting the condition and by using the .OH radicals. Since the .OH radicals become .O radicals by oxidation so as to dissociate $H^+$ ions, such conditions are advantageous in charged flocculation of particles. However, since the .OH radicals are generated only for such a short period of time as 1 to 10 μs, the generation frequency must be set high, but this reversely makes it difficult to obtain a large linear voltage. Accordingly, by setting the electrode planes near to each other, it is possible to increase the generation of .OH radicals. In this manner, phenols can be decomposed in an extremely short period of time as shown in, for instance, FIG. 6.

Furthermore, by providing a membrane structure to the upper plane portion of the anode surface to intercept molecules 200 Da or larger in batch treatment, the decomposed products are re-decomposed in the liquid portion of the lower space (9). The decomposition efficiency can be increased by thus providing a two-stage decomposition complex structure of membranes.

Concerning the case of generating toxic gases such as $NO_x$, $SO_x$, $H_2S$, etc., during the oxidative decomposition of polluted water, it is preferred that these gases are re-decomposed. As an apparatus for implementing such a treatment, there is provided an apparatus as described in the seventh and the eighth aspect of the present invention, comprising an electrically insulated cylindrical vessel provided at the central portion thereof with a metallic rod coated with an electrically conductive oxide to provide an anode. The outer side of the metallic rod is surrounded concentrically by a porous metal plate to provide a cathode. A metallic cylinder, the inner surface of which is coated with an electrically conductive oxide, is provided with a gas inlet portion to introduce a gas into the inner side of the cylinder and with a gas outlet portion, thereby providing an apparatus for oxidatively destructing a trace injurious substance contained in gas exhaust. A power generator is also provided for applying a current from 1 to 50 mA at a linear voltage of from 0.4 kV/cm to 7 kV/cm and at a frequency of from 50 to 150 kHz to the anode and the cathode.

Furthermore, as a preferred embodiment, there is provided an oxidatively destructing apparatus in which a partition is provided inside the cylindrical vessel in a direction orthogonal to the central axis.

Figure 3:
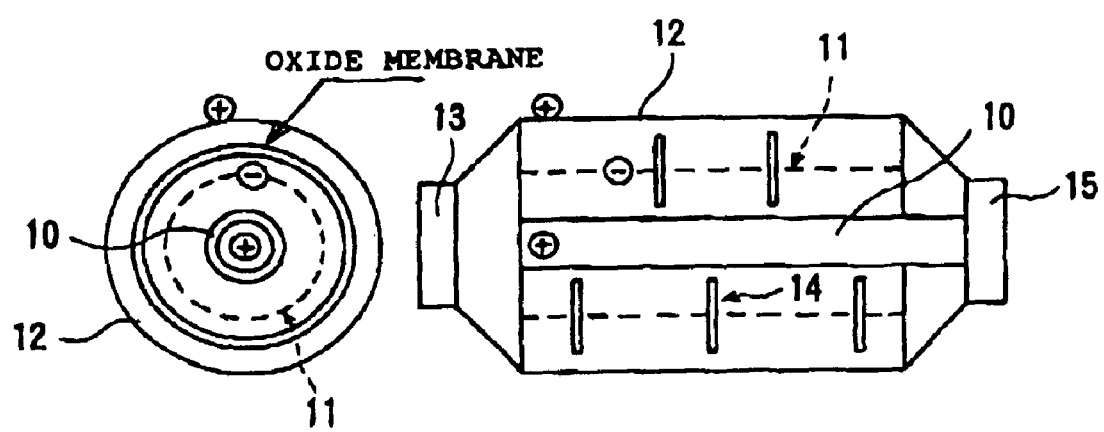
FIG. 3 is a schematic drawing showing an example of an apparatus for use in oxidative decomposition of a gas.

FIG. 3 shows an example of a constitution described above. Referring to FIG. 3, a rod of titanium, stainless steel, etc., which is coated with an electrically conductive oxide such as titanium oxide, tin oxide, ruthenium oxide, etc., is used as an anode (10), and a porous metal plate made of stainless steel or titanium is used as a cathode (11) concentrically surrounding the anode (10). Furthermore, a titanium or a stainless steel cylinder (12) comprising an inner wall covered with the electrically conductive oxide as described above is provided at the outer side of the resulting structure. These are enclosed in an electrically insulated cylindrical vessel (not shown).

Gas is introduced from a gas flow inlet (13) and, while being interfered with by the partition plate (14), flows along the axial direction towards the gas outlet (15) in a single path.

In accordance with the apparatus, it is confirmed that $NO_x$, $H_2S$, etc., are 70 to 80% decomposed by performing a treatment under conditions of a linear voltage of 1 kV/cm, a current of 2 mA, and a frequency of 50 kHz.

In accordance with the ninth aspect of the invention, there is provided an apparatus comprising an electrically insulated cylindrical vessel provided at the central portion thereof with a metallic rod-like body having provided optionally on the surface thereof platinum to provide a cathode, and ceramics or a resin is provided to electrically insulate the cathode. A spiral hoop having its surface coated with an electrically conductive oxide is wound around the cathode, and a stainless steel plate or a titanium plate covers the outer wall of the resulting structure to provide an anode. The cylindrical vessel further comprises a gas inlet portion and a gas exhaust portion to provide an apparatus for oxidatively destructing a trace injurious substance of a gas exhaust. A power generator applies a current from 1 to 50 mA at a linear voltage of from 0.4 kV/cm to 7 kV/cm and at a frequency of from 50 to 150 kHz between the anode and the cathode.

Figure 4:
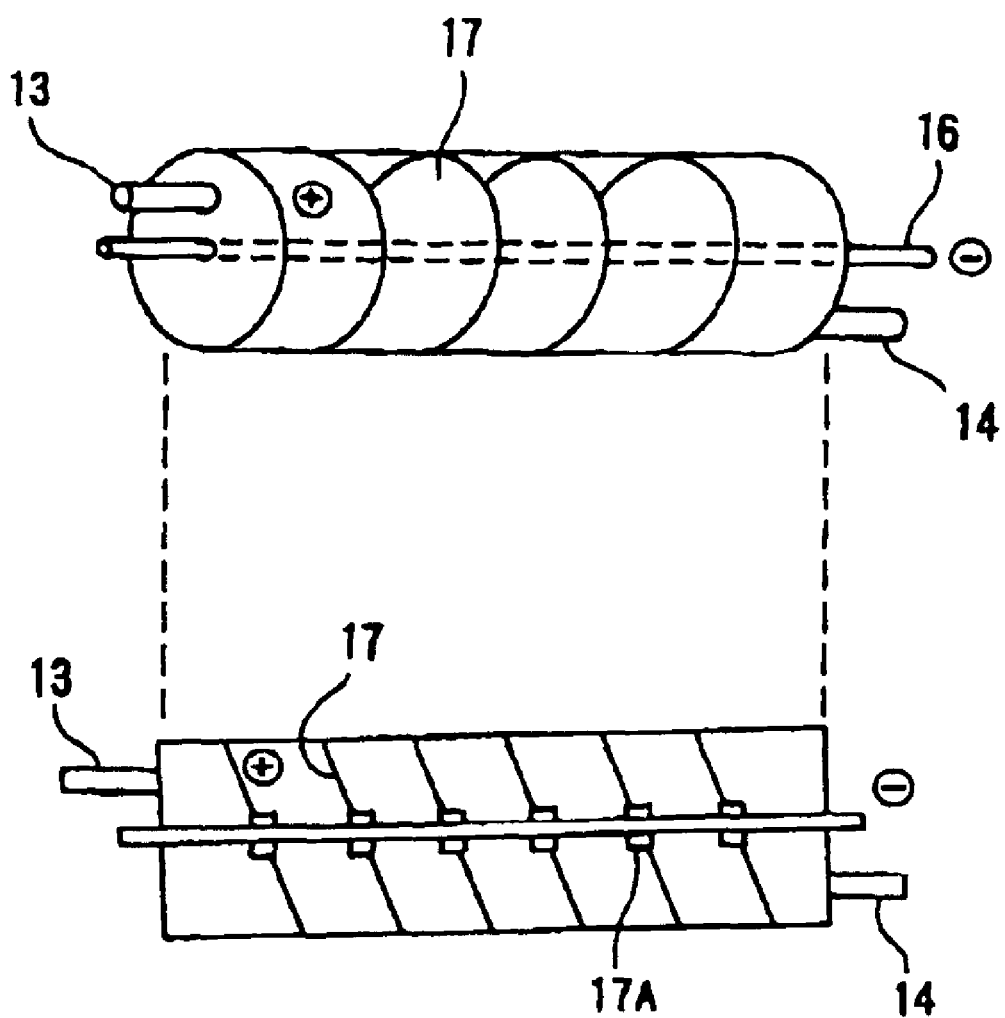
FIG. 4 is a schematic drawing showing an example other than that shown in FIG. 3.

FIG. 4 shows an example of a constitution described above. Referring to FIG. 4, an axial portion (16) is provided as a cathode, and a spiral hoop having its spiral surface (17) coated with a metallic oxide is used as an anode. The inner side of the outer casing of the spiral surface (17) of the anode is also coated with a metallic oxide, such that gas entering from the gas flow inlet (13) may flow along the spiral surface. By providing a finely pitched spiral, the efficiency of removing the toxic gas can be increased, but the pressure loss is reversely increased. For instance, in the case of a spiral surface having an outer diameter of 12 cm for the spiral surface and pitched at 30 mm, with a cylinder length of 30 cm, it is confirmed that a removal ratio of 90 to 95% is achieved for $NO_x$ and $H_2S$ by applying a current of 2 mA at a linear voltage of 1 kV/cm and a frequency of 50 kHz.

Further, in accordance with a tenth aspect of the present application, there is provided an apparatus for oxidatively destructing a trace injurious substance having a structure comprising electrically insulated cylinders or rectangular pipes provided with a plurality of metallic cylinders, each of which has an inside coated with an electrically conductive oxide such as tin oxide or titanium oxide or platinum to provide an anode, and metal placed at the inner center of each of the metallic cylinders to provide cathodes. The structure further comprises a gas inlet portion and a gas exhaust portion to provide an apparatus for oxidatively destructing a trace injurious substance of a gas exhaust. A power generator applies a current in a range of 0.5 to 50 mA at a linear voltage of from 0.4 kV/cm to 7 kV/cm and at a frequency in a range of 50 to 150 kHz between the anode and the cathode.

Figure 5:
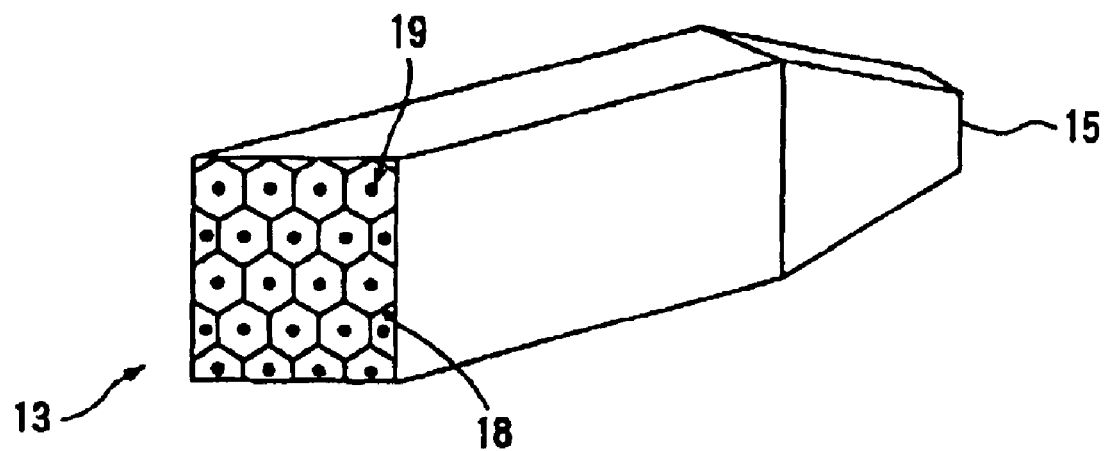
FIG. 5 is a schematic drawing showing another example.
Figure 6:
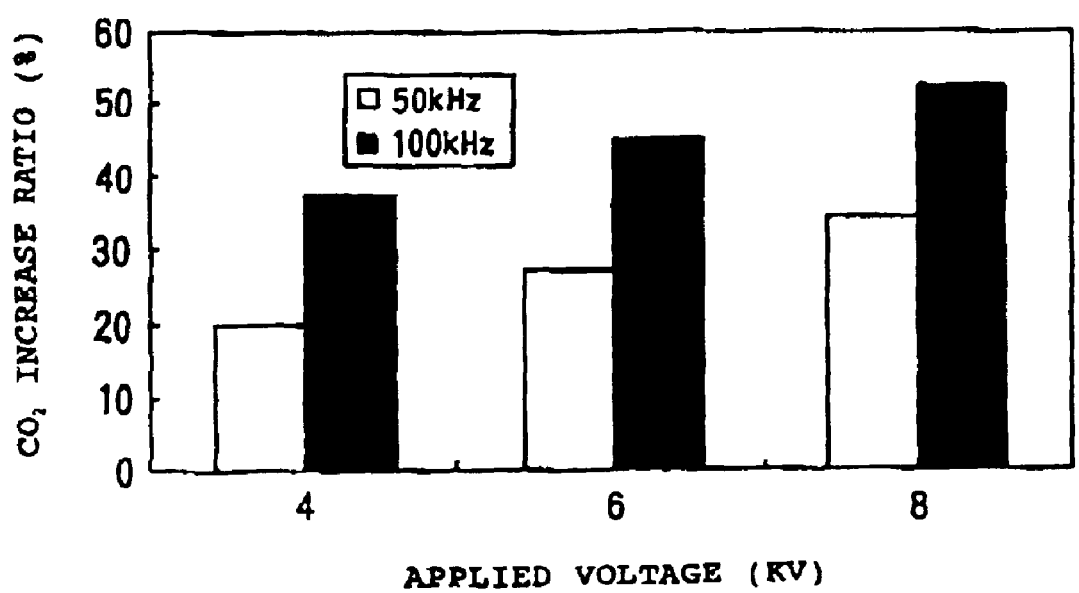
FIG. 6 is a diagram showing an example of a result of the increase ratio of $CO_2$ on applying an oxidative treatment.

FIG. 5 shows an example of the constitution described above. Consideration is made on the apparatus to use it in the oxidative combustion of dioxin as well as hydrocarbons and CO contained in gas exhaust discharged from automobile engines, and for the decomposition of black exhaust and $NO_x$ discharged from diesel engines. About 50-$\phi$ titanium pipe having its inner surface coated with tin oxide is used for the cylindrical body (piping) (18), and a platinum wire (19) is placed at the center thereof. By feeding saturated water vapor and synthetic gas having a CO concentration of 1%, an electric field is applied at frequencies of 100 kHz and 50 kHz (each at a duty ratio of 50%). The observed results for a linear voltage of 1 kV/cm are shown in FIG. 6. It is possible to further increase the oxidative decomposition ratio by employing a honeycomb structure or by improving the fusing technique on fusing tin oxide or titanium oxide to the inside of the cylindrical or rectangular honeycomb structure. Since the possibility of decomposing dioxin contained in combustion gas is readily read from FIG. 6, the removal efficiency is presumably increased by reducing the diameter and increasing the length of the electrodes, while increasing the frequency in a range of from 150 to 200 kHz. So long as the results obtained by performing the experiments on a gas of ordinary temperature are concerned, it is known that $NO_x$ and $SO_x$ can be oxidation treated. Hence, the apparatus is believed useful for reducing $NO_x$ and $SO_x$ contained in the gas exhaust from diesel engines.

More practically, in case of oxidative treatment of injurious substances contained in the above gases, for instance, there can be considered use of the conditions below in performing the treatment.
Objects:
Compost, waste gas from sewage disposal, bad odor from water closet and the like, combustion gas wastes, dioxin, $NO_x$ and $SO_x$, gas exhaust from automobiles, hydrocarbons.
Method:
The treatment is conducted under conditions as follows.
Voltage is set at higher values of from 6 to 7 kV/cm with a pulse width of from 20 to 25 Us, at a duty ratio of from 30 to 50% (at a gas flow rate of 1 m/s or lower), and at a current of from 1 to 5 mA (set at lower values).

Water is supplied by gas spray method using an atomizer. The temperature is set to 200° C. or lower (to avoid hydrolysis).

Some examples are shown below to describe the present invention in further detail.

EXAMPLES

Example 1

Apparatus for Separating and Recovering Algae

Polluted water containing water-bloom at a chlorophyll concentration of 50 μg/L was supplied into an apparatus equipped with an anode provided with titanium oxide and a stainless steel cathode as shown in FIG. 1 at a flow rate of 1 L/min, and was continuously treated by applying an electric field at a frequency of 50 kHz, a linear voltage of 400 V/cm, and at a current of 5 mA. The results thus obtained are shown in Table 1. It can be understood that gaseous nitrogen and gaseous $N_2O$ generate; and, from the material balance of nitrogen and phosphorus, it can also be understood that the nitrogen component is destructed. On the other hand, it can be clearly understood that phosphorus is settled and transferred to the deposit side.

TABLE 1

Treatment of polluted water containing water-bloom

| Items | COD | TOC | T-N | T-P |
|---|---|---|---|---|
| Raw water (mg/L) | 6.7 | 68.0 | 1.45 | 0.93 |
| Supernatant after treatment (mg/L) | 1.0 | 7.0 | 0.22 | 0.09 |
| Deposit (%) | — | 9.5 | 3.60 | 1.36 |

Example 2

Decomposition Experiment of Phenol

Figure 7:
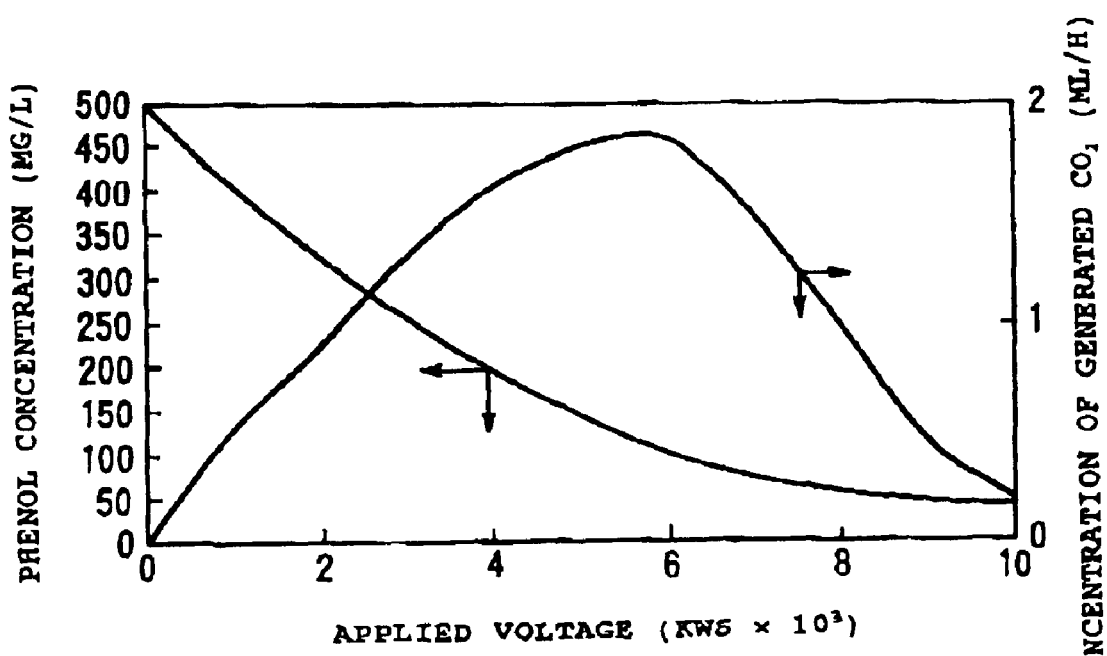
FIG. 7 is a diagram showing an example of a practical result on applying an oxidative decomposition to phenol.
Figure 8:
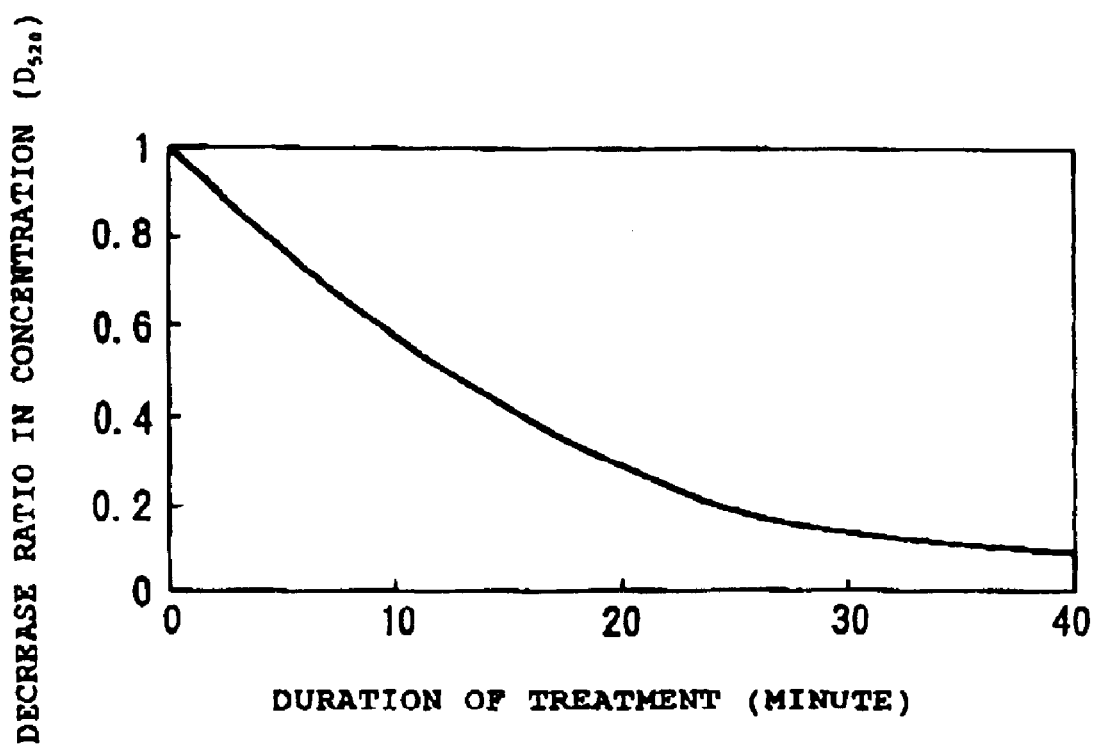
FIG. 8 is a diagram showing an example of decreasing polyphenol.

In order to assure a ring opening reaction of the benzene rings in phenol, decomposition of phenol was performed in batches by using an apparatus equipped with an anode provided with tin oxide and a stainless steel cathode as shown in FIG. 2. From the results thus obtained shown in FIG. 7, it can be understood that phenol is surely decomposed. Although the formation of intermediate products is observed during the decomposition, the intermediate products disintegrated with the passage of time. For the browning substances having high molecular weights such as polyphenols, a planar metallic oxide membrane having a molecular fractionation of 20,000 Dalton was formed, and the apparatus was operated at a pressure of 0.3 MPa. As a result, the turbidity $D_{520}$ was found to decrease extremely rapidly (FIG. 8).

Example 3

By using an apparatus shown in FIG. 2 equipped with an anode provided with tin oxide and a stainless steel cathode, and by using home wastewater passed through a 200-mesh sieve to remove solid content as the test raw water, oxidative destruction treatment was performed in batches for a duration of one hour. From the results thus obtained and shown in Table 2, it can be understood that 70 to 80% of soluble COD, ammonia, and nitrate nitrogen are removed.

TABLE 2

Results for oxidative destruction test on home wastewater

| Voltage | Current | mg/L | Soluble COD | $NH_4$—N | $NO_3$—N |
|---|---|---|---|---|---|
| 10 kV | 50 mA | Raw water | 12.3 | 7.0 | 2.0 |
|  |  | Treated water | 2.4 | 1.3 | 0.35 |
| 5 kV | 25 mA | Raw water | 12.9 | 7.8 | 2.5 |
|  |  | Treated water | 4.0 | 2.3 | 0.72 |

(Note) $NH_4$—N: Ammonia nitrogen
$NO_3$—N: Nitrate nitrogen

INDUSTRIAL APPLICABILITY

As described in detail above, prior art technologies using titanium oxide and UV radiation treatment suffered problems of low efficiency and high cost of running in case of treating polyphenols and the like substances that are hardly decomposable, or of technological limits in achieving a removal ratio exceeding 95% in case of treating blue algae, etc. However, the apparatuses according to the present invention realize complete and efficient removal of soluble COD, while considerably suppressing the cost of treatment by applying electric power to the surface of the metal oxide in pulses at a high voltage and at a low current, thereby realizing low duty ratio with low power consumption, and yet eliminating the use of flocculants. The electromagnetic waves function to generate .O radicals and .OH radicals on the surface of the electrodes to leave $H^+$ ions in the liquid. These radicals oxidize (combust) organic matter contained in wastewater to generate $CO_2$ and $N_2$. Furthermore, the apparatus according to the present invention oxidatively destructs environmental hormones such as trace injurious substances such as trihalomethanes and tributyltin and ring-opens aromatic compounds to make the substances harmless. Furthermore, the irradiation of high electric fields in pulses destructs the cells of algae and fungi, and is therefore effective for sterilization. In the case of blue-algae, oxygen is degassed from the cavities in the cells upon irradiating electromagnetic radiations, and the remaining cells rapidly become charged by $H^+$ ions to cause flocculation and settling. In addition, by imparting an ultrafiltration function to the surface of the oxide membrane and by performing treatment under a high electric field, toxic gases such as gaseous $NO_x$ generated during the wastewater treatment or gas exhausts ($NO_x$, $SO_x$, etc.) from the automobiles can be oxidatively decomposed.

What is claimed is:

1. An apparatus for oxidatively destructing a trace injurious substance, comprising:

a plurality of anodes, each of said anodes having a surface with an electrically conductive oxide integrally applied thereto and being made of a metal;

a partition made of a porous ceramic or resin material and arranged between said anodes;

a plurality of cathodes surrounding said anodes, each of said cathodes being made of a metal plate having inner walls on each side to which a noble metal is fused, wherein said anodes, cathodes, and partition are arranged to form at least two chambers in a planar symmetrical arrangement for oxidatively destructing the trace injurious substance contained in polluted water flowing through said chambers; and a rectangular wave discharging device for applying an electric field to said chambers so that the polluted water flowing through a first one of said chambers is subjected to irradiation of the electric field, and so that a resulting supernatant from said first one of said chambers thereafter flows through a second one of said chambers and is subjected to irradiation of the electric field.

2. The apparatus of claim 1, wherein said partition is set at a distance in a range of 1 cm to 10 cm from each of said anodes and said cathodes, said rectangular wave discharging device being operable to apply a rectangular wave discharge to said chambers at a frequency in a range of 10 kHz to 200 kHz, a linear voltage of from 200 V/cm to 10 kV/cm, and a current of from 0.5 mA to 50 mA, and said chambers being arranged so that the polluted water flows to said first one of said chambers at a flow rate in a range of 0.01 m/s to 0.1 m/s.

3. The apparatus of claim 2, wherein said electrically conductive oxide integrally applied to said surface of each of said anodes is made of at least one material selected from a group consisting of titanium oxide, tin oxide, and ruthenium oxide, and said noble metal fused to said metal plate of each of said cathodes is platinum.

4. A method of oxidatively destructing a trace injurious substance, comprising flowing the polluted water through said chambers of said apparatus of claim 2.

5. The apparatus of claim 1, wherein said electrically conductive oxide integrally applied to said surface of each of said anodes is made of at least one material selected from a group consisting of titanium oxide, tin oxide, and ruthenium oxide, and said noble metal fused to said metal plate of each of said cathodes is platinum.

6. A method of oxidatively destructing a trace injurious substance, comprising flowing the polluted water through said chambers of said apparatus of claim 5.

7. A method of oxidatively destructing a trace injurious substance, comprising flowing the polluted water through said chambers of said apparatus of claim 1.

8. An apparatus for oxidatively destructing a trace injurious substance, comprising:

a cathode including porous metal plates, each of said porous metal plates having surfaces each having a film of electrically conductive oxide particles integrally applied thereto so as to have a selective molecular fractionation transmittance;

a vessel having a metallic surface and being arranged to surround said porous metal plates of said cathode so as to form a space;

anodes including porous metal plates; and a voltage applying device for applying an electric field to said space via said anodes and said cathode, wherein said cathode, said vessel, said anodes, and said voltage applying device are arranged so as to pressure circulate polluted water through said space while said voltage applying device applies voltage to said anodes and said cathode for oxidatively destructing the trace injurious substance contained in the polluted water, thereby performing ultrafiltration to output filtrate from said space.

9. The apparatus of claim 8, wherein each of said porous metal plates has a film with a thickness in a range of 10 $\mu$m to 20 $\mu$m made of electrically conductive oxide particles each having a particle diameter in a range of 0.001 $\mu$m to 0.01 $\mu$m, and having a selective transmittance of $50\times10^4$ Dalton to $2\times10^4$ Dalton in molecular fractionation, said space being shaped and arranged so that the polluted water is pressure circulated under a pressure of 0.2 MPa to 6.0 MPa, and said voltage applying device being operable to apply voltage at a frequency in a range of 10 kHz to 200 kHz and at a linear voltage of from 200 V/cm to 10 kV/cm between said anodes and said cathode.

10. The apparatus of claim 9, wherein said film of electrically conductive oxide particles is made of at least one material selected from a group consisting of titanium oxide, tin oxide, and ruthenium oxide, and said vessel is made of a stainless metal having a platinum surface.

11. A method of oxidatively destructing a trace injurious substance, comprising flowing the polluted water through said space of said apparatus of claim 9.

12. The apparatus of claim 8, wherein said film of electrically conductive oxide particles is made of at least one material selected from a group consisting of titanium oxide, tin oxide, and ruthenium oxide, and said vessel is made of a stainless metal having a platinum surface.

13. A method of oxidatively destructing a trace injurious substance, comprising flowing the polluted water through said space of said apparatus of claim 12.

14. A method of oxidatively destructing a trace injurious substance, comprising flowing the polluted water through said space of said apparatus of claim 8.

15. An apparatus for oxidatively destructing a trace injurious substance, comprising:
an electrically insulated cylindrical vessel;
an anode including a metallic rod having a surface coated with an electrically conductive oxide, said anode being arranged in said vessel;
a cathode including a porous metal plate concentrically surrounding an outer side of said vessel;
a metallic cylinder having an inner surface coated with an electrically conductive oxide, said cylinder having a gas inlet portion for introducing a gas into an interior of said cylinder and having a gas outlet; and
a power generator for applying a current in a range of 1 mA to 50 mA at a linear voltage of from 0.4 kV/cm to 7 kV/cm and at a frequency of from 50 to 150 kHz to said anode and said cathode for oxidatively destructing the trace injurious substance contained in an exhaust gas.

16. The apparatus of claim 15, further comprising a partition inside said vessel and arranged in a direction orthogonal to a longitudinal axis of said vessel.

17. The apparatus of claim 16, wherein said electrically conductive oxide of said anode is at least one material selected from a group consisting of titanium oxide, tin oxide, and ruthenium oxide.

18. A method of oxidatively destructing a trace injurious substance, comprising flowing the exhaust gas through said metallic cylinder of said apparatus of claim 16.

19. The apparatus of claim 15, wherein said electrically conductive oxide of said anode is at least one material selected from a group consisting of titanium oxide, tin oxide, and ruthenium oxide.

20. A method of oxidatively destructing a trace injurious substance, comprising flowing the exhaust gas through said metallic cylinder of said apparatus of claim 19.

21. A method of oxidatively destructing a trace injurious substance, comprising flowing the exhaust gas through said metallic cylinder of said apparatus of claim 15.

22. An apparatus for oxidatively destructing a trace injurious substance, comprising:
an electrically insulated cylindrical vessel having a gas inlet portion and a gas exhaust portion;
a cathode at a central portion of said vessel, said cathode including a metallic rod-shaped body having a platinum-coated surface;
an insulating material electrically insulating said cathode, said insulating material comprising a ceramic material or a resin material;
a spiral hoop having a surface coated with an electrically conductive oxide, said spiral hoop being wound around said cathode;
an anode including a metal plate covering an outer wall of said vessel, said metal plate being formed of stainless steel or titanium; and
a power generator for applying a current in a range of 1 mA to 50 mA at a linear voltage in a range of 0.4 kV/cm to 7 kV/cm and at a frequency in a range of 50 kHz to 150 kHz between said anode and said cathode for oxidatively destructing the trace injurious substance of an exhaust gas.

23. The apparatus of claim 22, wherein said electrically conductive oxide of said spiral hoop is at least one material selected from a group consisting of titanium oxide, tin oxide, and ruthenium oxide.

24. A method of oxidatively destructing a trace injurious substance, comprising flowing the exhaust gas through said vessel of said apparatus of claim 22.

25. An apparatus for oxidatively destructing a trace injurious substance, comprising:
an anode including electrically insulated cylinders each having an inside surface coated with an electrically conductive oxide or platinum, said cylinders having a gas inlet portion and a gas exhaust portion;
a cathode at a center of each of said cylinders; and
a power generator for applying a current in a range of 0.5 mA to 50 mA at a linear voltage in a range of 0.4 kV/cm to 7 kV/cm and at a frequency in a range of 50 kHz to 150 kHz between said anode and said cathode for oxidatively destructing the trace injurious substance of a gas exhaust.

26. The apparatus of claim 25, wherein said electrically conductive oxide of said anode is at least one material selected from a group consisting of titanium oxide, tin oxide, and ruthenium oxide.

27. A method of oxidatively destructing a trace injurious substance, comprising flowing the exhaust gas through said cylinders of said apparatus of claim 25.

* * * * *